H. MENDELSOHN.
STAMP RACK.
APPLICATION FILED MAY 1, 1914.
1,242,017.
Patented Oct. 2, 1917.
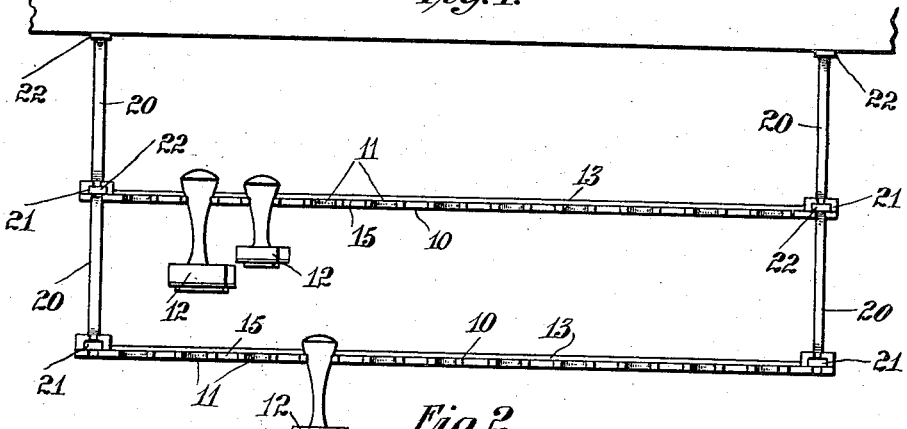
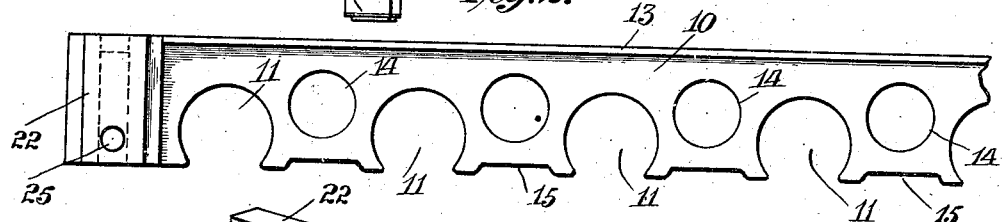
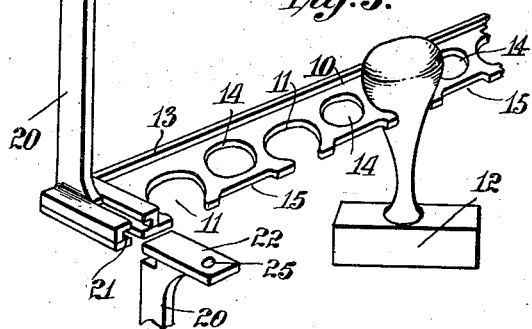
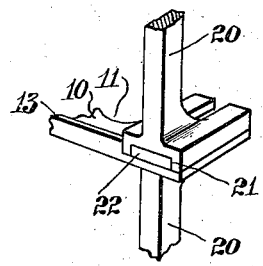
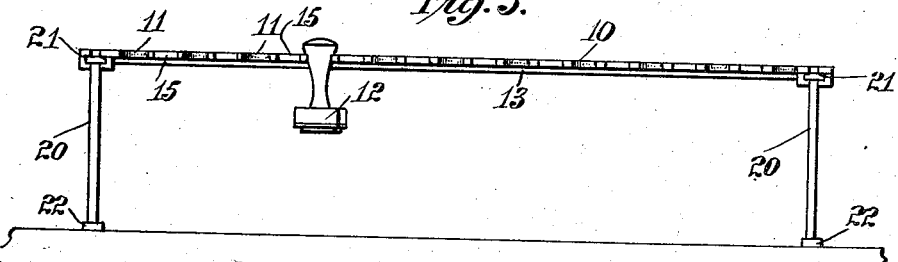

UNITED STATES PATENT OFFICE.

HARRY MENDELSOHN, OF MOUNT VERNON, NEW YORK.

STAMP-RACK.

1,242,017. Specification of Letters Patent. Patented Oct. 2, 1917.

Application filed May 1, 1914. Serial No. 835,684.

*To all whom it may concern:*

Be it known that I, HARRY MENDELSOHN, a citizen of the United States, residing at Mount Vernon, in the county of Westchester and State of New York, have invented certain new and useful Improvements in Stamp-Racks, fully described and represented in the following specification and the accompanying drawings, forming a part of the same.

This invention relates to a rack for holding hand stamps or other similar articles. The invention aims to provide a rack for holding a number of stamps which, while of simple and inexpensive construction, shall be convenient to use and when attached to a bookkeeper's desk or table shall take up a minimum amount of space compared to its holding capacity. A further object of the invention is to provide a rack constructed on the unit system, each rack unit being complete in itself and two or more units being adapted to be readily connected together to provide a rack of desired capacity.
A full understanding of the invention can best be given by a detailed description of an approved form of rack made in accordance with the invention and embodying the various features thereof, and such a description will now be given in connection with the accompanying drawings, in which:—

Figure 1 is a front view of a two-unit rack made in accordance with the invention;

Fig. 2 is an enlarged top or plan view of a portion of one of the rack units in the position shown in Fig. 1;

Fig. 3 is a perspective view of a portion of one of the rack units showing also the interlocking end of one of the end supports of a second unit separated from the first unit;

Fig. 4 is a detail perspective view of the end of a rack bar looking from the rear;

Fig. 5 is a front elevation of a single-unit rack in position with the end supports extending downward from the rack bar to rest on the upper side of a table or desk or other supporting body.

Referring to the drawings, the rack as shown in Fig. 1 consists of two rack units, which units are of similar form and construction and each of which is adapted to be used either alone as a single-unit rack or in connection with one or more others to form a multiple-unit rack having two or more superposed rack bars. Each rack unit comprises a rack bar 10 which extends horizontally when the rack is mounted for use and which is formed with a plurality of spaced recesses 11 extending inward from one longitudinal edge thereof, such recesses being of a size and form to conveniently receive and to hold the handles of the hand stamps or other articles to be supported by the rack.
Several such hand stamps 12 are shown in the drawings hung in the rack. Such hand stamps are commonly made with handles having enlarged outer ends, and may be conveniently hung in the rack by passing a smaller part of the handle into one of the openings 11 and then allowing the stamp to fall to be supported by a larger portion of its handle coming into engagement with the edges of the holding recesses. The stamp will then be securely supported and may be removed by simply lifting it a little and withdrawing it. Stamp racks having circular supporting members formed with peripheral stamp handle receiving recesses have been made heretofore, and I make no claim broadly to a rack having open recesses for receiving and holding the stamp handles.

The rack bar of each rack unit is best formed of a flat metal bar or elongated plate which may be cut or cast or otherwise formed with the spaced stamp handle receiving recesses extending inward from a longitudinal edge thereof, and such a flat bar may, if desired, be strengthened by means of a longitudinally extending flange or rib such as the rib 13 at its rear edge as shown, or in other suitable manner. To lighten the bar it may also be formed with openings 14 between the recesses 11, the front edge of the bar between the recesses being most desirably not cut away but left as shown in the drawings to provide guard edges 15 between the recesses to prevent the stamp handles being inserted at the wrong places in the rack.

Extending transversely from each end of the rack bar, and best at right angles thereto and formed integral with or permanently connected thereto, is a supporting member or leg 20, the outer end of which is formed for convenient attachment to whatever the rack is to be mounted on, as to the under side of, for example, the shelf of a bookkeeper's desk as shown in Fig. 1 when the rack is to be hung below such a shelf, or to the top of a desk or table when the rack is to be mounted other side up as shown by Fig. 5.

To provide for connecting similar rack units together, each rack unit is formed at or adjacent the inner ends of its supports 20 with a transverse slideway or socket 21 and the outer ends of the support 20 are outwardly flanged or formed with plates 22 to slide into and fit snugly within the sockets 21 of adjacent rack units. Two or more rack units may thus be readily connected together by simply sliding the end plates 22 of the supports of one unit into the sockets or slideways 21 of another rack unit. While by thus providing each rack unit with complementary interlocking members, any two such units may be connected together either one above or below the other, obviously, however, a rack unit intended to serve only as the upper unit or one which is to serve only as the lower unit in a multiple-unit rack need be formed with only the interlocking or other connecting members or means for connection with the complementary members or means of the next adjacent rack unit. The end plates 22, which might be made relatively longer if desired, are adapted to serve also as the means for attaching the rack to the desk or table, being for this purpose formed with screw holes 25.

What is claimed is:

1. A stamp rack unit comprising a rack bar having a plurality of spaced stamp handle receiving recesses opening inward from a longitudinal edge thereof and having supporting members extending transversely therefrom, and having complementary interlocking means at opposite extremities of the supporting members, whereby two or more similar rack units may be connected together to form a rack having a plurality of superposed rack bars.

2. A stamp rack unit comprising a rack bar having a plurality of spaced stamp handle receiving recesses opening inward from a longitudinal edge thereof and having supporting means extending transversely therefrom, and having complementary connecting means at opposite extremities of the supporting means, whereby two or more similar rack units may be connected together to form a rack having a plurality of superposed rack bars.

3. A stamp rack unit comprising a rack bar having a plurality of spaced stamp handle receiving recesses opening inward from a longitudinal edge thereof and having supporting members extending transversely therefrom, the rack bar being provided with transverse slideways or sockets and the ends of the supporting members being flanged to fit into the slideways or sockets of a similar rack unit.

4. A stamp rack unit comprising a rack bar having a plurality of spaced stamp handle receiving recesses opening inward from a longitudinal edge thereof and having supporting members extending transversely therefrom, the rack bar being provided with transverse slideways or sockets to receive flanged ends of supporting members of a similar rack unit.

5. A stamp rack comprising a plurality of superposed rack bars each having a plurality of spaced stamp handle receiving recesses opening inward from a longitudinal edge thereof, and supporting members connecting the rack bars, each supporting member being connected with one of the rack bars by interlocking means formed respectively on the supporting member and the rack bar.

In testimony whereof I have hereunto set my hand in the presence of two subscribing witnesses.

HARRY MENDELSOHN.

Witnesses:
A. L. KENT,
PAUL H. FRANKE.

Copies of this patent may be obtained for five cents each, by addressing the "Commissioner of Patents, Washington, D. C."